US008720721B2

(12) United States Patent
Dutzi et al.

(10) Patent No.: US 8,720,721 B2
(45) Date of Patent: May 13, 2014

(54) CAPLESS REFUELING SYSTEM

(75) Inventors: Robert K. Dutzi, Palatine, IL (US);
Bryan M. Miller, Orland Park, IL (US);
William A. Purdy, Plainfield, IL (US);
Stephen M. Sperando, Glen Ellyn, IL (US);
Paul M. Sutenbach, Highland Park, IL (US); Franco A. Cisternino, Deerfield, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/504,764

(22) PCT Filed: Oct. 26, 2010

(86) PCT No.: PCT/US2010/054021
§ 371 (c)(1),
(2), (4) Date: Apr. 27, 2012

(87) PCT Pub. No.: WO2011/053563
PCT Pub. Date: May 5, 2011

(65) Prior Publication Data
US 2012/0217240 A1    Aug. 30, 2012

Related U.S. Application Data

(60) Provisional application No. 61/256,591, filed on Oct. 30, 2009.

(51) Int. Cl.
*B65D 47/02* (2006.01)
*B65D 41/06* (2006.01)

(52) U.S. Cl.
USPC .................................... 220/86.2; 220/295

(58) Field of Classification Search
USPC ........ 141/350; 290/295; 285/292.1; 403/348, 403/349
See application file for complete search history.

(56) References Cited

U.S. PATENT DOCUMENTS

| 3,266,200 A | * | 8/1966 | Block ........................... 451/509 |
| 4,158,983 A | * | 6/1979 | Amico ............................ 411/55 |
| 4,532,672 A | * | 8/1985 | Anderson ..................... 16/86 A |
| 5,044,883 A | * | 9/1991 | Neueder ..................... 415/214.1 |
| 5,347,673 A | * | 9/1994 | Nickels, Jr. .................... 15/97.1 |
| 5,466,020 A | * | 11/1995 | Page et al. ..................... 285/361 |

(Continued)

FOREIGN PATENT DOCUMENTS

| DE | 202005012620 U1 | 10/2005 |
| EP | 1690727 A2 | 8/2006 |
| EP | 1738950 A1 | 1/2007 |

OTHER PUBLICATIONS

ISR for PCT/US2010/054021 dated Feb. 16, 2011.

*Primary Examiner* — Anthony Stashick
*Assistant Examiner* — Kaushikkumar Desai
(74) *Attorney, Agent, or Firm* — Mark W. Croll; Paul F. Donovan

(57) ABSTRACT

A capless refueling system is provided which utilizes snap-in attachment of a multi-stage valve assembly within a fuel pipe. The valve assembly includes a lower body portion and a cover independent from the lower body portion. The lower body portion and the cover are configured to be lockingly adjoined to one another. The cover is adapted to be adjoined to the fuel pipe. The system is sealed at a position above the primary shutoff valve thereby eliminating the need for a spring pin support bracket.

20 Claims, 5 Drawing Sheets

(56) References Cited

U.S. PATENT DOCUMENTS

| | | | |
|---|---|---|---|
| 5,657,792 A * | 8/1997 | Prest | 138/89 |
| 5,667,251 A * | 9/1997 | Prest | 285/12 |
| 6,170,882 B1 * | 1/2001 | Prest | 285/12 |
| 6,520,547 B2 * | 2/2003 | Robinson | 285/330 |
| 6,945,290 B1 * | 9/2005 | Benjey et al. | 141/302 |
| 7,011,121 B2 * | 3/2006 | Bar et al. | 141/350 |
| 7,708,036 B2 | 5/2010 | Bar | |
| 7,950,425 B2 | 5/2011 | Och | |

* cited by examiner

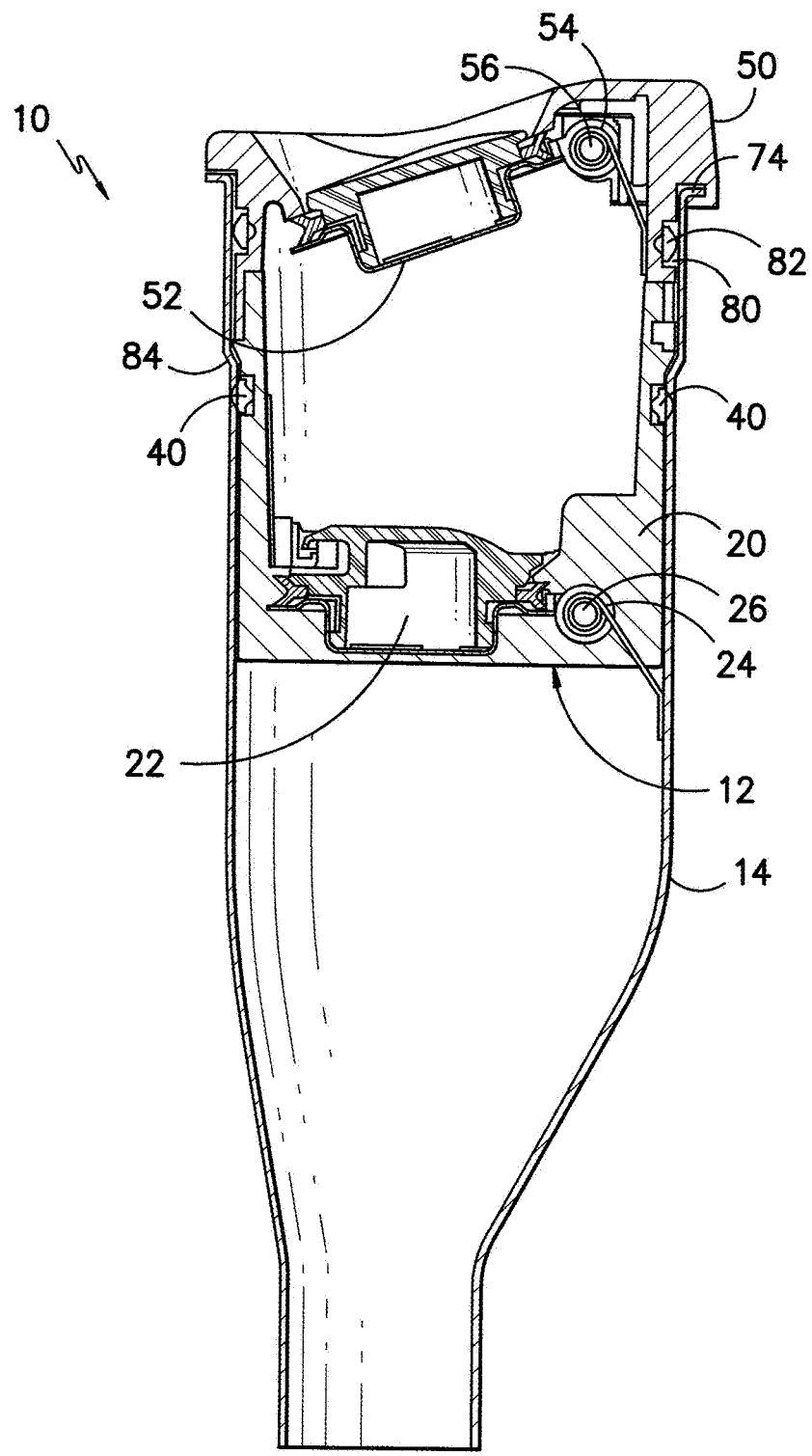
FIG. -1-

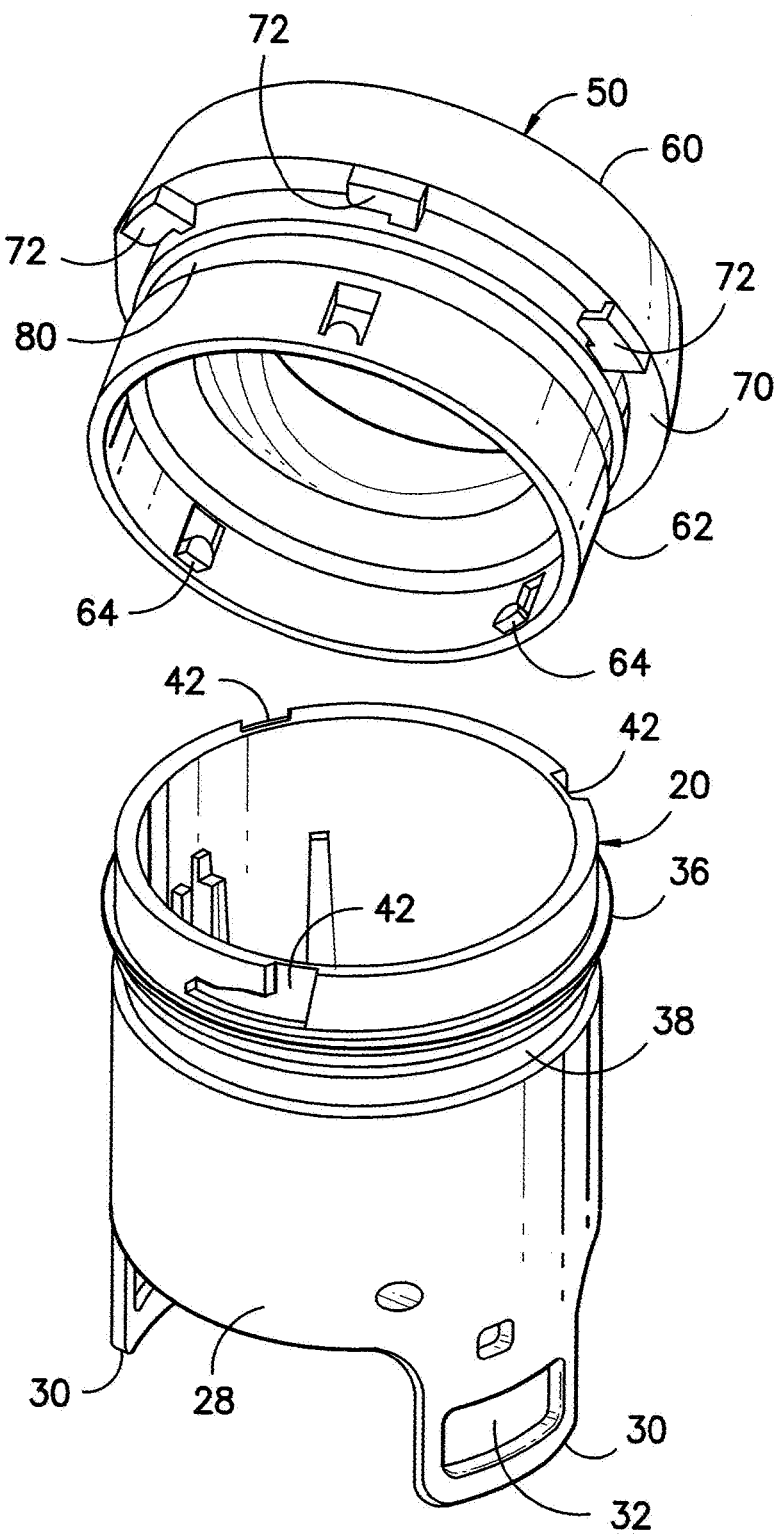
FIG. —2—

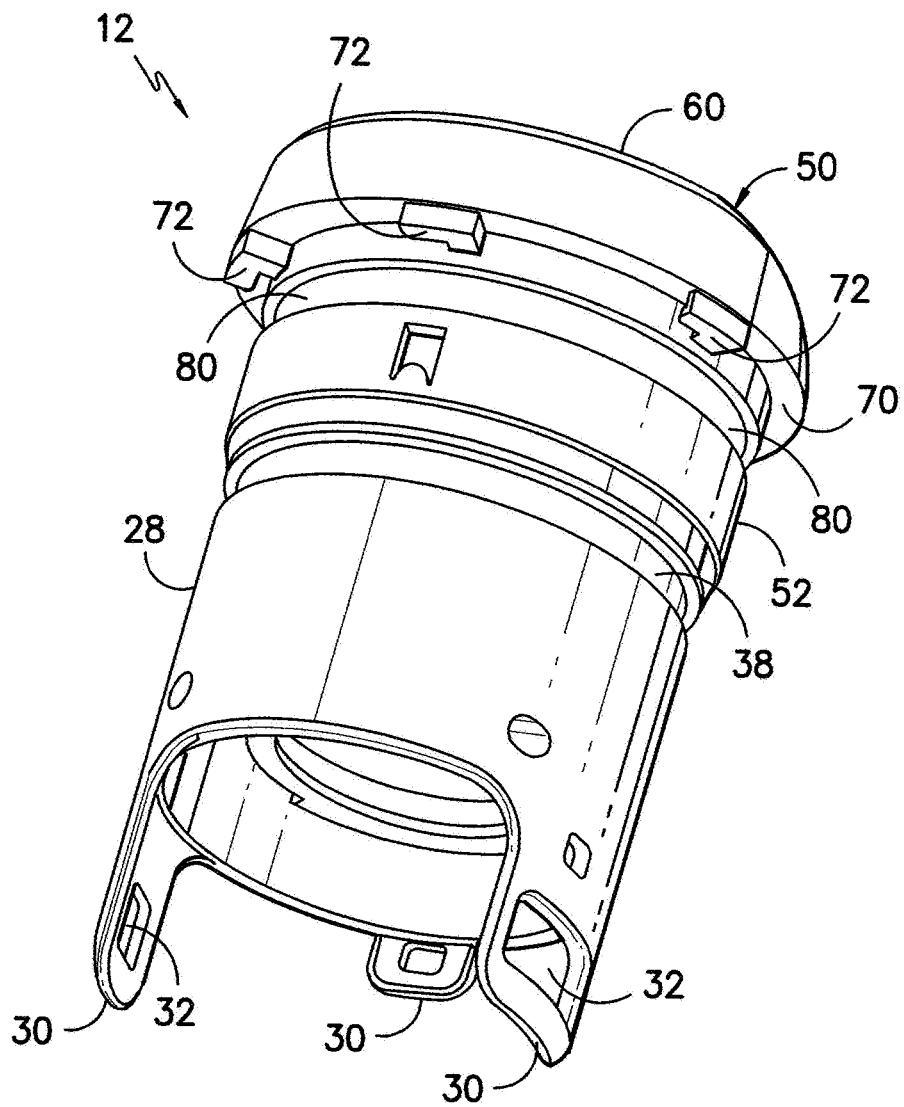
FIG. -3-

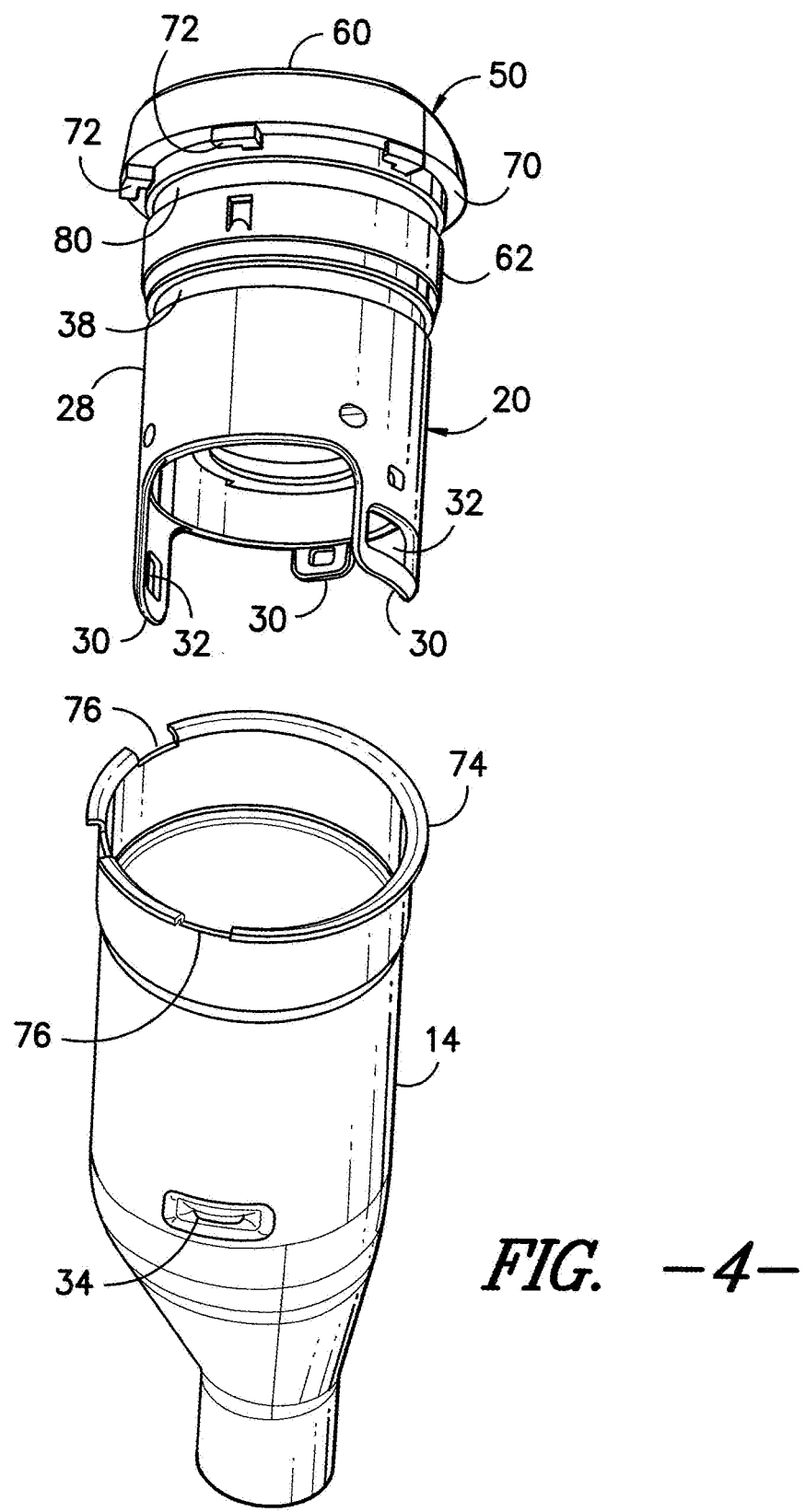
FIG. -4-

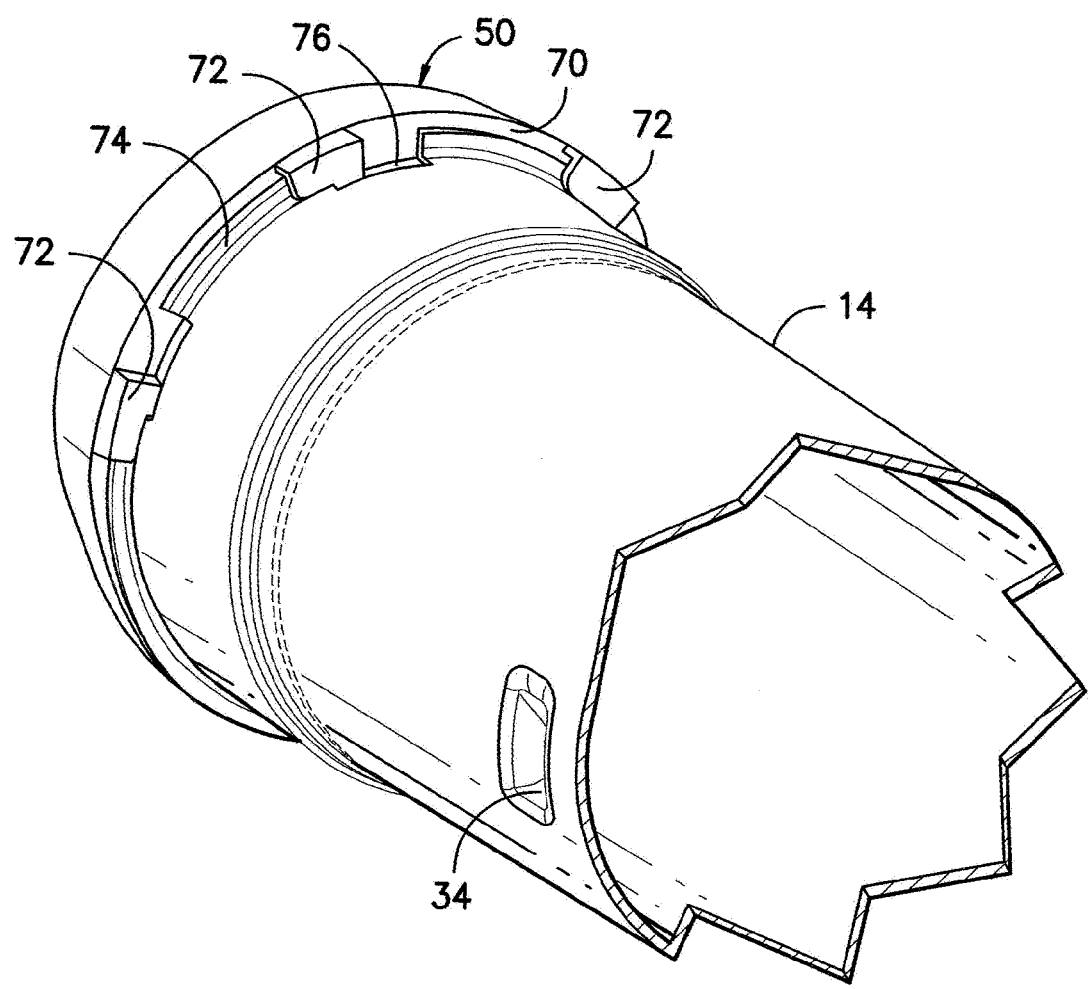
FIG. —5—

CAPLESS REFUELING SYSTEM

CROSS-REFERENCE TO RELATED APPLICATION

This non-provisional application is national phase of PCT/US2010/054021 filed Oct. 26, 2010, and claims the benefit of, and priority from, U.S. Provisional Application 61/256,591 filed Oct. 30, 2009.

TECHNICAL FIELD

The present invention relates generally to refueling systems for introduction of a fuel from a supply source through a fuel pipe and into a holding tank for subsequent use. More particularly, the invention relates to capless refueling systems in which a cover assembly for the fuel pipe opens upon insertion of a pump nozzle and then closes upon withdrawal of the nozzle without the need for a cap.

BACKGROUND OF THE INVENTION

So called capless refueling systems are known. Such systems typically use a two-part cover assembly to seal the fuel pipe when a supply nozzle is not in place. A first part of the assembly which is referred to as the primary shut off valve or PSV typically includes a valve element such as a float valve or the like which is normally held closed by a spring which is mounted at a bracket at the interior of the PSV. The PSV which houses the spring, the spring mounting bracket and the valve element is snapped into the interior of the contoured fuel pipe. In a known prior construction an upper cover which houses an upper flapper valve snaps around the outer diameter of the fuel pipe over the top of the PSV. Both the PSV and the upper cover are retained by engaging slot openings disposed around the perimeter of the fuel pipe. That is, portions of the PSV and the upper cover snap into slot openings in the fuel pipe.

As will be appreciated, it is undesirable to permit moisture to enter the fuel supply. However the slot openings in the prior construction may act as an entryway for the introduction of moisture from the environment. To prevent any introduced moisture from entering the fuel supply, an O-ring or other body seal element is typically positioned in the annular region between the fuel pipe and the PSV body at a position axially below the slot openings in the fuel pipe. In this construction it is desirable to avoid having radial openings in the PSV body at positions above the body seal since such radial openings would provide a potential bypass flow path around the body seal. Accordingly the spring which biases the valve element in the PSV is typically mounted on a dedicated bracket that is fully contained at the interior of the PSV body. While such prior systems are highly functional, the need to mount a separate spring bracket at the interior of the PSV body results in added complexity.

SUMMARY OF THE INVENTION

The present invention provides advantages and alternatives over the prior art by providing a capless refueling system which does not rely on slot openings within the fuel pipe for attachment of the PSV and which seals at a position above the spring pin and lower valve element thereby eliminating the need for the spring pin support bracket. Such an arrangement reduces complexity and avoids possible collection of corrosion inducing moisture at the interior. The present invention provides further advances over the prior art by providing a capless refueling system with improved retention features for the PSV and overlying cover to facilitate modular pre-assembly practices.

In accordance with one exemplary aspect, the present invention provides a capless refueling system including a multi-stage valve assembly adapted for disposition in inserted, locked relation at an axial opening in a fuel pipe having an outwardly projecting lip. The valve assembly includes a lower body portion and a cover independent from the lower body portion. The lower body portion includes an upper ring segment having a pattern of surface face grooves extending away from an upper edge. The lower body portion further includes a seat for a sealing element for disposition between the lower body portion and an inner surface of the fuel pipe. The lower body portion may house a primary shutoff valve and a first biasing spring urging the primary shutoff valve to a normally closed position. The first biasing spring is disposed at a position below the seat for the sealing element. The cover includes an upper portion and a reduced diameter sleeve extending away from the upper portion. Detents extend radially inwardly from an inner surface of the sleeve. The sleeve has an inner diameter such that the upper ring segment of the lower body portion fits in sliding relation within the sleeve with the detents riding within complementary surface face grooves such that relative rotation of the cover to the lower body portion causes the detents to travel along the surface face grooves into locked relation relative to the upper ring segment such that the cover and the lower body portion are locked together. The cover includes a plurality of receptors disposed about the perimeter adapted to receive and retain radially projecting segments of the fuel pipe lip such that axial withdrawal of the cover from the fuel pipe is blocked. The cover may house an access valve normally biased to a closed condition.

In accordance with a particular exemplary aspect, the present invention provides a capless refueling system including a fuel pipe having an upper proximal portion and a lower distal portion in which the upper proximal portion includes an axial opening with an outwardly projecting lip extending radially away from the axial opening. The lip is discontinuous about the circumference of the axial opening and includes radially projecting segments separated by one or more defined gaps. The fuel pipe has a stepped geometery at the intersection between the upper proximal portion and the lower distal portion with the diameter of the upper proximal portion being greater than the diameter of the lower distal portion. The fuel pipe may include one or more surface indentations defining inwardly projecting surfaces adapted for snap-fit engagement with an inserted structure. A multi-stage valve assembly is adapted for disposition in inserted relation at the interior of the fuel pipe, the valve assembly includes a substantially cylindrical lower body portion and a cover independent from the lower body portion. The lower body portion includes an upper edge and an outwardly projecting circumferential collar disposed below the upper edge to define an upper ring segment. The upper ring segment includes a pattern of dogleg surface face grooves extending from the upper edge. The lower body portion further includes a circumferential groove disposed below the collar. The circumferential groove defines a seat for a sealing element for disposition between the lower body portion and an inner surface of the fuel pipe. The lower body portion includes one or more downwardly extending connection legs including window openings adapted to snap around complementary inwardly projecting surface indentations at the inner surface of the fuel pipe. The lower body portion houses a primary shutoff valve and a first biasing spring urging the primary shutoff valve to a normally closed position. The first biasing spring is supported at a support pin extending through an outer wall of the lower body portion at a position below the sealing element between the lower body portion and an inner surface of the fuel pipe. The cover includes an upper portion and a reduced diameter sleeve extending away from the upper portion to define a downwardly projecting shoulder surface. A plurality of detents extends radially inwardly from an inner surface of the sleeve. The sleeve has an inner diameter such that the upper ring segment of the lower body portion fits in sliding relation within the sleeve with the detents riding within complementary surface face grooves such that relative rotation of the cover to the lower body portion causes the detents to be blocked against axial withdrawal from the surface grooves such that the cover and the lower body portion are locked together. A plurality of bayonet projections extends away from the downwardly projecting shoulder surface. The bayonet projections are adapted to receive and retain radially projecting segments of the fuel pipe lip upon relative rotation between the cover and the fuel pipe such that axial withdrawal of the cover from the fuel pipe is blocked. The cover houses a flapper valve and a second biasing spring urging the flapper valve to a normally closed position. The cover includes at least one circumferential groove disposed below the downwardly projecting shoulder surface with the circumferential groove defining a seat for a sealing element disposed between the sleeve and an inner surface of the fuel pipe at a position above the detents.

BRIEF DESCRIPTION OF THE DRAWINGS

FIG. 1 is a schematic partial cut-away view illustrating an exemplary construction for a capless refueling system in accordance with the present invention incorporating a PSV body and cover relative to a slotless fuel pipe including a dual O-ring seal;

FIG. 2 is an exploded schematic view illustrating an exemplary cover and PSV body for use in conjunction with a slotless fuel pipe in a capless refueling system in accordance with the present invention;

FIG. 3 is an assembled schematic view illustrating the exemplary cover and PSV body of FIG. 2 in attached relation forming a subassembly for insertion into a fuel pipe to form a capless refueling system;

FIG. 4 is a schematic view illustrating the subassembly of FIG. 3 positioned for insertion into the interior of a slotless fuel pipe in a capless refueling system in accordance with the present invention; and FIG. 5 illustrates cover retention features of an exemplary improved attachment arrangement for the cover in a capless refueling system in accordance with the present invention.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Reference will now be made to the various figures, wherein to the extent possible like elements are designated by like reference numerals in the various views. FIG. 1 illustrates an exemplary capless refueling system 10 including a multi-stage valve assembly 12 adapted for disposition within a fuel pipe 14. By way of example only, the fuel pipe 14 may be formed from metal sheet material such as steel or the like which is formed into a desired hollow tube-like structure, although other materials may be used if desired. As will be appreciated, the fuel pipe 14 provides fluid communication with a fuel storage tank to provide a supply of fuel to an internal combustion engine or the like (not shown). As will be described further hereinafter, the valve assembly 12 is adapted to provide a secure snap-in engagement with the fuel pipe 14 with a seal between the valve assembly 12 and the fuel pipe 14 at a position above the primary shut off valve (PSV) such that moisture cannot enter the fuel pipe 14 through openings in the PSV. As will be appreciated, avoiding moisture introduction reduces the possibility of fuel contamination and corrosion of internal components.

Referring jointly to FIGS. 1-3, it is seen that in the illustrated exemplary configuration the valve assembly 12 incorporates a PSV body 20 (i.e. lower body portion) of material such as molded thermoplastic or the like which is adapted to be matedly inserted into the proximal end of the fuel pipe 14. By way of example only, and not limitation, exemplary materials for forming the PSV body may include molded polyamides such as Nylon 6 and Nylon 6,6, polypropylene, polyesters, ABS and the like although other materials may likewise be used if desired. By way of example only, the PSV body 20 may be formed as a one piece structure using techniques such as injection molding or the like.

As illustrated, in the exemplary configuration, the PSV body 20 has a contoured interior defining a seat for a primary shutoff valve 22 such as a float valve or the like which is held in a normally closed condition by a biasing spring 24 mounted at a support pin 26 (FIG. 1). The support pin 26 may be mounted within an acceptance opening in the wall of the PSV body 20. In operation, the primary shutoff valve 22 is opened during introduction of fluid fuel into the interior of the PSV body 20 such that the primary shutoff valve 22 lifts away from its seated condition thereby permitting the liquid fuel to pass into the interior of the fuel pipe 14 for gravity flow transfer to the fuel tank. During the fueling operation the biasing spring 24 provides a continuous biasing closing force to shut the primary shutoff valve 22. Once the liquid fuel has been drained from the interior of the PSV body 20 the primary shutoff valve 22 is urged to its initial closed condition thereby preventing backflow of the fuel.

In the illustrated exemplary configuration, the PSV body 20 has a generally cylindrical outer wall 28 (FIG. 2) with an arrangement of connection legs 30 extending downwardly at positions about the lower edge. As shown, the connection legs 30 may include window openings 32 which are adapted to receive fuel pipe indentations 34 (FIG. 4) which are arranged at positions around the fuel pipe 14. Accordingly, when the PSV body 20 is inserted into the interior of the fuel pipe 14, the connection legs 30 may flex inwardly as they pass over the inwardly projecting curved surfaces of the fuel pipe indentations 34 and then snap into place with the fuel pipe indentations 34 projecting through the window openings 32. In this assembled condition, the PSV body is held in a snap-fit relation at a predetermined height and rotational orientation within the fuel pipe 14. Of course, it is likewise contemplated that any number of other snap-in connection arrangements may likewise be utilized. By way of example only, and not limitation, in one contemplated practice, the fuel pipe 14 may include one or more indentations in the form of ring segments extending partially or completely about the circumference of the fuel pipe 14 and the PSV body 20 may include complementary outwardly projecting ring segments which pass over the indentations in the fuel pipe during insertion and which are then blocked against withdrawal by the indentations in the fuel pipe. It is also contemplated that the fuel pipe 14 may be crimped in place relative to the PSV body 20 using a compression tool at positions about the circumference. As will be appreciated, these snap-in relationships between the fuel pipe 14 and the PSV body 20 may be subject to reversal by the application of axial tensioning force.

As best seen in FIG. 2, in the exemplary embodiment the PSV body 20 includes a circumferential collar 36 extending partially or completely about the PSV body 20 at a position below the upper edge of the PSV body 20. Thus, an upper ring segment extends between the circumferential collar 36 and the upper edge of the PSV body 20. As shown, a circumferential groove 38 defining a seat for an o-ring 40 (FIG. 1) or other seal element is oriented at a position below the circumferential collar 36 to form a sealing relation between the fuel pipe 14 and the PSV body 20. The upper ring segment of the PSV body 20 located above the circumferential collar includes a pattern of surface grooves 42 of generally dogleg configuration extending away from the upper edge. The surface grooves 42 are adapted to lockingly engage a cover 50 in a manner as will be described further hereinafter.

As shown, the exemplary valve assembly 12 includes a cover 50 which may house a flapper valve 52 defining an access valve which is normally biased to a closed position by a biasing spring 54 mounted at a spring pin 56 at the interior of the cover 50 (FIG. 1). By way of example only, and not limitation, exemplary materials for forming the cover 50 may include molded polyamides such as Nylon 6 and Nylon 6,6, polypropylene, polyesters, ABS and the like although other materials may likewise be used if desired. By way of example only, the cover 50 may be formed as a one piece structure using techniques such as injection molding or the like.

In operation, the flapper valve 52 may be pushed to an open condition by the introduction of a fuel nozzle (not shown) for delivery of liquid fuel into the aligned PSV body 20. During the fueling operation, the biasing spring 54 provides a continuous biasing closing force urging the flapper valve 52 upwardly to the closed position. Once the fuel nozzle has been removed, the biasing force from the biasing spring 54 causes the flapper valve 52 to return upwardly to the closed position thereby sealing the system. Although flapper valve 52 is shown and described, other access valve assemblies may be utilized and the flapper valve 52 is merely shown as an example of one such assembly.

In the illustrated exemplary configuration, the cover 50 is adapted to lock in place relative to both the fuel pipe 14 and to the PSV body 20 so as to establish a fixed connection. As best seen in FIG. 2, in the exemplary construction, the cover 50 has a generally stepped cylindrical configuration with an enhanced diameter upper portion 60 and a reduced diameter sleeve 62 extending away from the upper portion 60. In the exemplary construction, the reduced diameter sleeve 62 has an inner diameter which substantially matches the outer diameter of the upper ring portion of the PSV body located above the circumferential collar 36. Thus, the reduced diameter sleeve 62 may fit in sliding arrangement about the upper ring segment of the PSV body.

In the exemplary configuration, detent elements 64 project radially inwardly from the inner surface of the reduced diameter sleeve 62. The detent elements 64 are configured and arranged in a pattern for alignment with the surface grooves 42 at the upper ring segment of the PSV body 20 such that the detent elements 64 may be received into the axially oriented portions of the surface grooves 42 as the reduced diameter sleeve 62 slides over the upper ring segment of the PSV body 20. As noted previously, the surface grooves 42 have a generally dogleg configuration. Thus, once the reduced diameter sleeve 62 has been pushed over the upper ring segment of the PSV body 20 with the detent elements 64 disposed within the surface grooves 42, the cover 50 may then be rotated relative to the PSV body so as to lock the components in place against axial disengagement. If desired, additional locked stability may be provided by incorporating one or more flexible blocking elements such as flexible tabs or the like which may extend in angled relation across a portion of the surface grooves 42 such that the detent elements 64 may pass over the blocking elements and into the circumferential portions of the surface grooves 42 during locking rotation while being blocked against reverse movement unless the blocking elements are broken away. As will be appreciated, in practice, the PSV body 20 and the cover 50 incorporating the internal components as previously described may be pre-assembled in locking engagement to form the valve assembly 12 as a modular unit which then may be inserted axially into the fuel pipe 14 (FIG. 4) in a separate operation.

As noted previously, upon insertion of the PSV body into the fuel pipe 14, a snap-fit engagement may be established to define the axial and circumferential orientation of the valve assembly 12 relative to the fuel pipe 14. In accordance with one exemplary feature of the present invention, a locked relationship may be provided by engagement between the cover 50 and the fuel pipe 14. As best seen through joint reference to FIGS. 2 and 4, the intersection between the upper portion 60 and the reduced diameter sleeve 62 of the cover 50 defines a downwardly facing shoulder surface 70. As shown, an arrangement of bayonet projections 72 extends downwardly from the shoulder surface 70 at positions around the cover 50. As shown in FIG. 4, the upper edge of the fuel pipe 14 may include a discontinuous radially projecting lip 74 including an arrangement of defined gaps 76 interposed between radially projecting portions. In the exemplary arrangement, the bayonet projections are positioned in a pattern around the cover 50 for alignment with corresponding gaps 76 such that upon insertion of the valve assembly 12 into the fuel pipe 14, each of the bayonet projections 72 is received within a corresponding gap 76. As will be appreciated, a channel is defined behind the bayonet projections 72 which have a sufficient depth in the radial direction to receive the radially projecting lip 74. Thus, upon relative rotation between the cover 50 and the fuel pipe 14 a locked engagement may be established with portions of the projecting lip 74 being locked behind the bayonet projections 72. Of course, any other suitable arrangement for establishing a locked relation to the fuel pipe may be utilized. For example, the fuel pipe 14 may include a continuous radially projecting lip and the cover may include flexible fingers for a snap-fit connection.

As best seen through reference to FIGS. 2-4, an upper circumferential groove 80 may be disposed about the reduced diameter sleeve 62 at a position below the shoulder surface 70. As will be appreciated, an O-ring 82 (FIG. 1) or other sealing member may be positioned at the upper circumferential groove 80 to form a sealing relationship between the reduced diameter sleeve 62 and the inner surface of the fuel pipe 14 at a position below the bayonet connection. Thus, the O-ring 82 may operate in conjunction with the O-ring 40 to form an effective seal at positions above the support pin 26.

As shown, the fuel pipe 14 may include a radial step 84 between an upper proximal portion of the fuel pipe 14 and a lower distal portion. As will be appreciated, the incorporation of such a radial step may be beneficial in promoting ease of insertion of the valve assembly 12 since the lower O-ring 40 does not have to be dragged a significant distance along the inner surface of the fuel pipe 14. However, a straight cylinder or other configuration without the step may likewise be used if desired.

As will be appreciated, the illustrated exemplary embodiment provides a highly efficient system which promotes ease of assembly and a secure locking relationship between all components. The system eliminates the need for slot openings in the fuel pipe 14 and orients the body seal in the form of O-ring 40 at a position above the support pin 26 thereby moving the body seal closer to the top of the fuel pipe and reducing the possibility of capturing and retaining moisture. With the body seal in this elevated position, the support pin can be mounted through holes in the PSV body thus eliminating the need for a separate pin bracket.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

Various features of the invention are set forth in the following claims.

What is claimed is:

1. A capless refueling system comprising:
    a valve assembly adapted for disposition in inserted, locked relation at an axial opening in a fuel pipe having an outwardly projecting lip, the valve assembly including a lower body portion and a cover independent from the lower body portion;
    the lower body portion including an upper ring segment having a pattern of surface face grooves extending from an upper edge, the lower body portion further including a seat for a sealing element for disposition between the lower body portion and an inner surface of the fuel pipe, and wherein the lower body portion houses a primary shutoff valve and a first biasing spring urging the primary shutoff valve to a normally closed position, wherein the first biasing spring is disposed at a position below the seat for the sealing element;
    the cover having an upper portion and a reduced diameter sleeve extending away from the upper portion, wherein a plurality of detents extends radially inwardly from an inner surface of the sleeve, the sleeve having an inner diameter such that the upper ring segment of the lower body portion fits in sliding relation within the sleeve with the detents riding within the complementary surface face grooves such that relative rotation of the cover to the lower body portion causes the detents to travel along the surface face grooves into locked relation relative to the upper ring segment, whereby the cover and the lower body portion are locked together, and wherein the cover includes a plurality of receptors disposed about the perimeter adapted to receive and retain radially projecting segments of the fuel pipe lip, whereby axial withdrawal of the cover from the fuel pipe is blocked and wherein the cover houses an access valve normally biased to a closed condition.

2. The capless refueling system as recited in claim 1, wherein the lower body portion is substantially cylindrical.

3. The capless refueling system as recited in claim 1, wherein the lower body portion is a one-piece molded polymer construction.

4. The capless refueling system as recited in claim 1, wherein the cover is a one piece molded polymer construction.

5. The capless refueling system as recited in claim 1, wherein the upper ring segment has a base defined by a circumferential collar projecting radially outwardly.

6. The capless refueling system as recited in claim 1, wherein the surface face grooves have a dogleg configuration.

7. The capless refueling system as recited in claim 1, wherein the lower body portion includes one or more downwardly extending connection legs including window openings adapted to retain complementary inwardly projecting surface indentations at the inner surface of the fuel pipe.

8. The capless refueling system as recited in claim 1, wherein the first biasing spring is supported at a support pin extending through an outer wall of the lower body portion at a position below the seat for the sealing element.

9. The capless refueling system as recited in claim 1, wherein the plurality of receptors includes one or more bayonet projections extending away from a downwardly projecting shoulder surface at the intersection of the upper portion and the diameter sleeve extending away from the upper portion.

10. The capless refueling system as recited in claim 1, wherein the cover includes at least one circumferential groove disposed about the reduced diameter sleeve, the circumferential groove defining a seat for a sealing element disposed between the sleeve and an inner surface of the fuel pipe at a position above the detents.

11. The capless refueling system as recited in claim 10, wherein the sealing element is an O-ring.

12. The capless refueling system as recited in claim 1, wherein the access valve is a flapper valve and wherein a second biasing spring urges the flapper valve to a normally closed position.

13. A capless refueling system comprising:
    a fuel pipe having an upper proximal portion and a lower distal portion, the upper proximal portion having an axial opening with an outwardly projecting lip extending radially away from the axial opening; and
    a valve assembly adapted for disposition in inserted relation at the interior of the fuel pipe, the valve assembly including a lower body portion and a cover independent from the lower body portion;
    the lower body portion including an upper ring segment having a pattern of surface face grooves extending from an upper edge, the lower body portion further including a seat for a sealing element for disposition between the lower body portion and an inner surface of the fuel pipe, and wherein the lower body portion houses a primary shutoff valve and a first biasing spring urging the primary shutoff valve to a normally closed position, wherein the first biasing spring is supported at a support pin extending through an outer wall of the lower body portion at a position below the seat for the sealing element;
    the cover having an upper portion and a reduced diameter sleeve extending away from the upper portion to define a downwardly projecting shoulder surface, wherein a plurality of detents extends radially inwardly from an inner surface of the sleeve, the sleeve having an inner diameter such that the upper ring segment of the lower body portion fits in sliding relation within the sleeve with the detents riding within the complementary surface face grooves such that relative rotation of the cover to the lower body portion causes the detents to travel along the surface face grooves into locked relation relative to the upper ring segment, whereby the cover and the lower body portion are locked together, and wherein the cover includes a plurality of receptors disposed about the perimeter adapted to receive and retain radially projecting segments of the fuel pipe lip, whereby axial withdrawal of the cover from the fuel pipe is blocked and wherein the cover houses an access valve normally biased to a closed condition.

14. The capless refueling system as recited in claim 13, wherein each of the lower body portion and the cover is a one-piece molded polymer construction.

15. The capless refueling system as recited in claim 13, wherein the upper ring segment has a base defined by a circumferential collar projecting radially outwardly.

16. The capless refueling system as recited in claim 13, wherein the surface face grooves have a dogleg configuration.

17. The capless refueling system as recited in claim 13, wherein the lower body portion includes one or more downwardly extending connection legs including window openings adapted to retain complementary inwardly projecting surface indentations at the inner surface of the fuel pipe.

18. The capless refueling system as recited in claim 13, wherein the plurality of receptors includes one or more bayonet projections extending away from a downwardly projecting shoulder surface at the intersection of the upper portion and the reduced diameter sleeve.

19. The capless refueling system as recited in claim 13, wherein the cover includes at least one circumferential groove disposed about the reduced diameter sleeve, the circumferential groove defining a seat for an O-ring disposed between the sleeve and an inner surface of the fuel pipe at a position above the detents.

20. A capless refueling system comprising:
a fuel pipe having an upper proximal portion and a lower distal portion, the upper proximal portion having an axial opening with an outwardly projecting lip extending radially away from the axial opening, the lip being discontinuous about the circumference of the axial opening and including radially projecting segments separated by one or more defined gaps, the fuel pipe having a stepped geometry at the intersection between the upper proximal portion and the lower distal portion, wherein the diameter of the upper proximal portion is greater than the diameter of the lower distal portion and wherein the fuel pipe includes one or more surface indentations defining inwardly projecting surfaces adapted for snap-fit engagement with an inserted structure; and a valve assembly adapted for disposition in inserted relation at the interior of the fuel pipe, the valve assembly including a substantially cylindrical lower body portion and a cover independent from the lower body portion;

the lower body portion including an upper edge and an outwardly projecting circumferential collar disposed below the upper edge to define an upper ring segment, the upper ring segment including a pattern of dogleg surface face grooves extending from the upper edge, the lower body portion further including a circumferential groove disposed below the collar, the circumferential groove defining a seat for a sealing element for disposition between the lower body portion and an inner surface of the fuel pipe, and wherein the lower body includes one or more downwardly extending connection legs including window openings adapted to retain complementary inwardly projecting surface indentations at the inner surface of the fuel pipe and wherein the lower body portion houses a primary shutoff valve and a first biasing spring urging the primary shutoff valve to a normally closed position, wherein the first biasing spring is supported at a support pin extending through an outer wall of the lower body portion at a position below the sealing element between the lower body portion and an inner surface of the fuel pipe;

the cover having an upper portion and a reduced diameter sleeve extending away from the upper portion to define a downwardly projecting shoulder surface, wherein a plurality of detents extends radially inwardly from an inner surface of the sleeve, the sleeve having an inner diameter such that the upper ring segment of the lower body portion fits in sliding relation within the sleeve with the detents riding within the complementary surface face grooves such that relative rotation of the cover to the lower body portion causes the detents to be blocked against axial withdrawal from the surface grooves, whereby the cover and the lower body portion are locked together, and wherein a plurality of bayonet projections extends away from the downwardly projecting shoulder surface, and wherein the bayonet projections are adapted to receive and retain radially projecting segments of the fuel pipe lip upon relative rotation between the cover and the fuel pipe, whereby axial withdrawal of the cover from the fuel pipe is blocked, and wherein the cover houses a flapper valve and a second biasing spring urging the flapper valve to a normally closed position, and wherein the cover includes at least one circumferential groove disposed below the downwardly projecting shoulder surface, the circumferential groove defining a seat for a sealing element disposed between the sleeve and an inner surface of the fuel pipe at a position above the detents.

* * * * *